United States Patent [19]

Barre

[11] 4,274,044
[45] Jun. 16, 1981

[54] DC-DC CONVERTER FOR CHARGING A BATTERY BY MEANS OF A SOLAR CELL

[75] Inventor: Claude Barre, Paris, France

[73] Assignee: U.S. Philips Corporation, New York, N.Y.

[21] Appl. No.: 45,490

[22] Filed: Jun. 4, 1979

[30] Foreign Application Priority Data

Jun. 30, 1978 [FR] France .................. 78 19659

[51] Int. Cl.³ .............. H02J 7/10; H02M 3/335; H03K 17/60
[52] U.S. Cl. ............................ 320/21; 307/580; 320/61; 331/112; 363/18
[58] Field of Search ............ 320/2, 61, 21, 39, 40; 363/18-20; 331/112; 368/205; 323/22 T, 15; 307/251

[56] References Cited

U.S. PATENT DOCUMENTS

| | | | |
|---|---|---|---|
| 2,854,614 | 9/1958 | Light | 363/19 |
| 2,881,380 | 4/1959 | Krüger | 363/18 |
| 3,681,674 | 8/1972 | Terry, Jr. | 363/18 |
| 4,015,609 | 4/1977 | Mensink et al. | 331/112 X |

Primary Examiner—Robert J. Hickey
Attorney, Agent, or Firm—William J. Streeter; Bernard Franzblau

[57] ABSTRACT

A DC-DC converter is described of the blocking oscillator type, for charging a battery from a solar cell. The use of a field effect transistor enables the oscillation to be started by the voltage from a single solar cell, even if the battery is fully exhausted. The overall efficiency of the circuit is improved by the use of the base-emitter junction of the switching transistor of the converter as rectifying element for the battery charging current.

7 Claims, 4 Drawing Figures

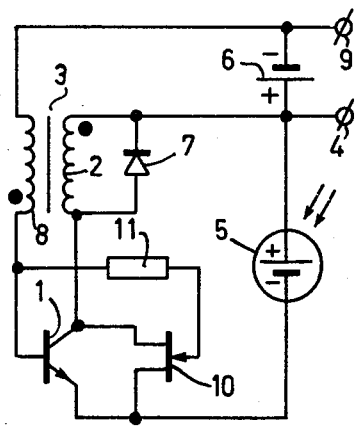
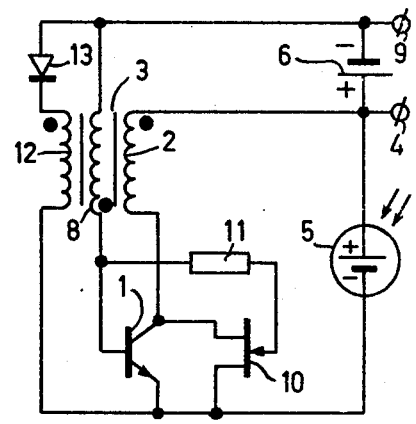
FIG.1  FIG.2
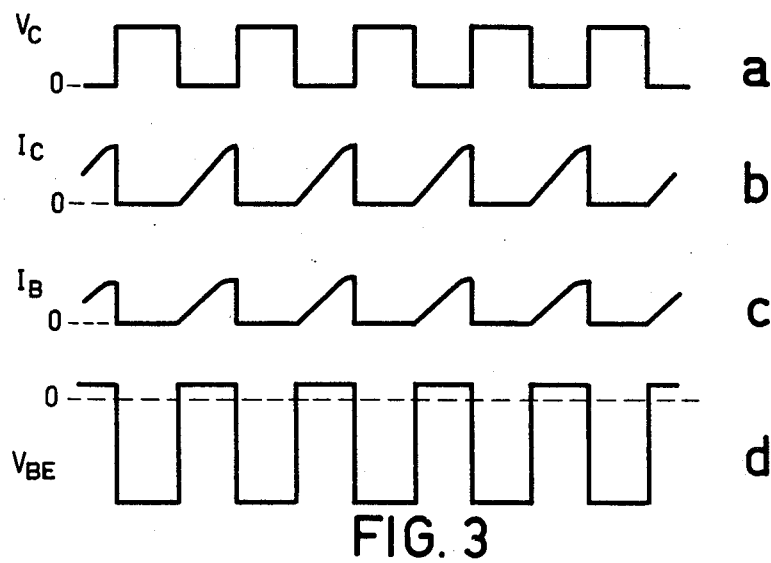
FIG. 3
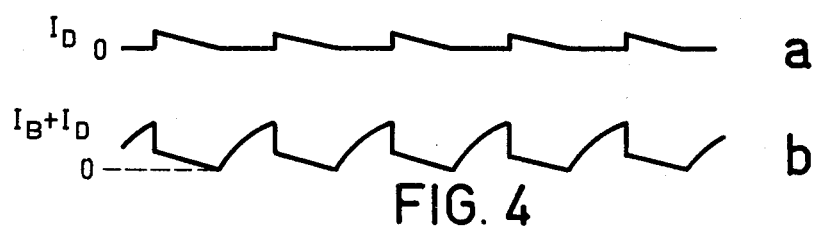
FIG. 4

DC-DC CONVERTER FOR CHARGING A BATTERY BY MEANS OF A SOLAR CELL

The invention relates to a d.c.-d.c. converter for charging a battery by means of a solar cell, which converter comprises a transformer, with a first end of the primary winding of the transformer connected to the collector of a switching transistor, having its base connected to a first end of the secondary winding of the transformer.

The invention, in particular, but not exclusively, relates to converter circuits which are adapted to energize electric or electronic clocks by means of solar energy.

As the energy supplied by a photo-voltaic generator varies daily as a function of the time and light level, this energy must be stored in a battery which powers the clock with a substantially constant voltage.

The battery may be supplied directly by a photovoltaic generator by including a blocking diode between these two elements. In order to enable sufficient energy to be supplied to the battery at a low insolation level, it is necessary to connect a plurality of solar cells in series. Under normal conditions of lighting the nominal output voltage of a photo-cell is not greater than 0.5 V. For charging a nickel-cadmium battery with a nominal voltage of 1.2 V four or five solar cells may be connected in series.

It is alternatively possible to employ a smaller number of solar cells, or even one cell, and to charge the battery via a d.c.-d.c. converter.

The use of a single solar cell has one serious drawback. If the solar cell has not been illuminated for some time, so that the battery has been discharged completely, and the cell is illuminated again, it may happen that the converter is not re-started spontaneously at the low voltage supplied by the single cell. The discharged battery would then have to be replaced by a charged battery, which is very undesirable.

Furthermore, in the known converters the direct current for charging the battery is obtained by rectifying the periodic voltage supplied by a special winding of the transformer. Thus, the overall efficiency of the circuit is reduced as a result of the losses owing to the magnetic coupling and the rectification. Moreover, the efficiency depends on the current supplied by the solar cell, which in its turn depends on the lighting conditions.

Ignoring the said re-starting problems, an overall efficiency of the order of magnitude of only 15 to 20% is therefore attainable when a single solar cell is used which is coupled to a known converter circuit. In order to ensure that the battery which powers the clock is charged continuously, the surface area of the cell should then be increased substantially.

However, the use of a single solar cell has certain esthetic, economical and technological advantages, such as a more satisfactory appearance, ease of construction, the absence of interconnections, etc.

It is an object of the invention to provide a converter circuit which can operate at the low voltage supplied by a single solar cell, even if the battery is fully exhausted.

It is a further object of the invention to provide a converter with a reasonable and substantially constant efficiency over a wide range of illumination of the single solar cell to which the converter is connected.

The converter in accordance with the invention is characterized in that a field-effect transistor is provided having a drain electrode connected directly to the collector, a source electrode connected directly to the emitter, and whose gate electrode connected via a resistor to the base of the switching transistor. In addition, the second end of the primary and the secondary winding are respectively connected to a first and a second output terminal of the converter, between which output terminals the battery to be charged may be connected, while the solar cell may be connected between the first output terminal and the emitter of the switching transistor.

Preferably, the transformer is provided with a third winding which is connected to one of the battery terminals via a diode.

The use of a field-effect transistor enables the converter to be started at the voltage supplied by a single solar cell. Use is then made of the variation of the drain current as a function of the gate-source voltage of the field-effect transistor.

Moreover, by charging the battery by means of the voltage appearing across the transformer secondary winding and by using the emitter-base junction of the switching transistor as a rectifying element, a substantial improvement in the efficiency is obtained as well as an automatic adaptation of the circuit over a wide range of values of the current supplied by the solar cell.

By providing the transformer with an additional regeneration winding, the overall efficiency of the circuit can be raised to 40% so that a clock or an electronic circuit for a clock can be energized permanently by means of a single solar cell of reasonable surface area.

The invention will be described in more detail with reference to the accompanying drawings, in which:

FIG. 1 shows the circuit diagram of the converter circuit in accordance with the invention, FIG. 2 shows a preferred embodiment of the converter circuit in accordance with the invention, FIGS. 3a to 3d are diagrams of the currents and voltages appearing in the circuit of FIG. 1, and FIGS. 4a and 4b are diagrams representing the currents in the circuit of FIG. 2.

In FIG. 1 the collector of an npn-transistor 1 is connected to one end of the primary winding 2 of a transformer 3. The other end of said winding is connected to the positive output terminal 4. This last-mentioned terminal is connected both to the positive pole of a solar cell 5 and to the positive terminal of a battery 6. The winding 2 of the transformer is shunted by a protection diode 7.

The emitter of the transistor 1 is connected to the negative pole of the solar cell 5, and, via the secondary 8 of the transformer 3, the base is connected to the negative output terminal 9, which terminal is connected to the negative terminal of the battery 6.

The drain and the source of a field-effect transistor 10 are respectively connected to the collector and the emitter of the transistor 1, and the gate is being connected to the base of the transistor 1 via a resistor 11.

The circuit of FIG. 1 is a kind of blocking oscillator.

It is known in such circuits that because of the magnetic coupling between the collector and base of the transistor 1 a cumulative effect occurs which produces very rapid switching between the off-state and the state of saturation of the transistor. During this switching the collector voltage varies from substantially zero to the value of the voltage supplied by the solar cell 5 (FIG. 3a). During the saturation period the collector current increases in a substantially linear manner (FIG. 3b).

In the circuit of FIG. 1 the battery 6 is charged by the voltage produced across winding 8 of the transformer 3 and the voltage supplied by the cell 5, charging being effected via the base-emitter junction of the transistor 1, which is forward-biassed. The charging current varies as shown in FIG. 3c, i.e. in substantially the same way as the collector current $I_c$ in accordance with FIG. 3b.

Thus, the battery 6 is charged by two seriesconnected voltage sources, the cell 5 and the winding 8. The effective charging voltage is equal to the sum of the voltages from the sources 5 and 8 minus the base-emitter threshold voltage ($V_{BE}$) of the transistor 1, which threshold voltage is for example 0.7 V.

If the cell 5, for example, supplies a voltage of 0.4 V it suffices if the winding supplies a charging voltage of $1.2-0.4+0.7=1.5$ V in order to overcome the back e.m.f. of the battery 6 of, for example, 1.2 V.

FIG. 3d represents the voltage $V_{BE}$ of the transistor 1. During the on-periods of the transistor 1 the voltage $V_{BE}$ is 0.7 V and during the off-periods this voltage has a negative value of a few Volts.

In the absence of the field-effect transistor 10 the oscillation process of the circuit of FIG. 1 cannot be started when the battery 6 is fully exhausted, even if the cell 5 supplies the maximum voltage.

When the field-effect transistor is included, owing to the variation of the drain current as a function of the voltage on the gate electrode of this transistor, the voltage of the cell 5 alone will produce a drain-source current which flows through the winding 2 of the transformer 3 so that the oscillation process can be started.

Once the oscillation has started the presence of the resistor 11 prevents a loss of energy in the gate circuit of the transistor 10.

In the circuit of FIG. 1 the energy stored in the magnetic circuit of the transformer, when the transistor 1 is turned off, is dissipated in the protection diode 7, so that no excess voltage can be formed.

In the preferred embodiment of FIG. 2, in which corresponding elements bear the same reference numerals as in FIG. 1, the transformer 3 comprises a third, socalled regeneration winding 12, one end of which is connected to the emitter of the transistor 1, whereas the other end is connected to the cathode of a diode 13, whose anode in turn is connected to the negative terminal of the battery 6.

At the instant that transistor 1 is turned off the residual magnetic energy is transferred to the battery 6 in the form of a current in the diode 13. The variation of this current $I_D$ is shown in FIG. 4a. This regenerative charging current is added to the normal charging current $I_B$ in FIG. 3c so that the total charging current $I_B+I_D$ will be as shown in FIG. 4b. Thus, the presence of the additional winding 12 results in a substantial improvement in the overall efficiency of the circuit.

The automatic adaptation of the converter circuit in accordance with the invention to the large variations of the current supplied by the cell 5 is due to the constant ratio between the collector current and the base current of the transistor 1, which merely depends on the transformation ratio between the windings 2 and 8 of the transformer 3.

What is claimed is:

1. A d.c.-d.c. converter for charging a battery by means of a solar cell comprising, a transformer having a primary winding and a secondary winding, a switching transistor having a base, a collector and an emitter, a field-effect transistor having a drain, a source and a gate electrode, means connecting a first end of the primary winding of the transformer to the collector of the switching transistor and the base to a first end of said secondary winding, a resistor, means connecting said field-effect transistor drain and source electrodes directly to the collector and the emitter, respectively, of said transistor, means connecting said gate electrode to the base of the switching transistor via said resistor, and means connecting the second ends of the transformer primary and secondary windings to first and second output terminals respectively of the converter, between which output terminals the battery is adapted to be connected, and wherein the solar cell is adapted to be connected between the first output terminal and the emitter of the switching transistor.

2. A d.c.-d.c. converter as claimed in claim 1 further comprising a diode having an anode and cathode and wherein the transformer further comprises a third winding having one end connected to the emitter of the switching transistor and a second end connected to the cathode of the diode, and means connecting the diode anode to the second output terminal of the converter.

3. A d.c.-d.c. converter as claimed in claim 1 further comprising a diode and wherein the transformer further comprises a third winding connected in series with the diode to said first and second output terminals and with the diode polarized so that turn-off of the switching transistor produces a charge current to a battery connected between said output terminals via said diode and the third winding.

4. A d.c.-d.c. converter for charging a rechargeable battery comprising, first and second output terminals for connection to the terminals of the battery, a transformer having first and second windings, a source of unidirectional voltage connected to said first output terminal, a transistor having base and emitter electrodes and a field-effect transistor having a gate electrode, a resistor, means connecting said transistor and said field-effect transistor in parallel circuit, means connecting said first winding in series with said parallel circuit to the terminals of said voltage source, means connecting the second winding, the base-emitter circuit of the transistor and the voltage source in series to said first and second output terminals, and means connecting the gate electrode of the field-effect transistor to the base of the switching transistor via said resistor, and said first and second windings are wound in a sense such that the switching transistor is alternately switched between a cut-off state and a conductive state and the second winding generates a voltage of the same polarity as the voltage source during the switching transistor conductive state thereby to provide a charge current for said battery determined by the series aiding voltages of the second winding and the voltage source.

5. A d.c.-d.c. converter as claimed in claim 4 wherein said voltage source comprises a solar cell.

6. A d.c.-d.c. converter as claimed in claim 4 or 5 further comprising a diode and wherein the transformer further comprises a third winding connected in series with the diode and the voltage source to said first and second output terminals and with the diode polarized and the third winding wound in a sense so that turn-off of the switching transistor produces a charge current to a battery connected between said output terminals.

7. A d.c.-d.c. converter as claimed in claim 4 wherein said voltage source comprises a single solar cell.

* * * * *